United States Patent
Chatterjee

(10) Patent No.: US 10,554,502 B1
(45) Date of Patent: Feb. 4, 2020

(54) SCALABLE WEB SERVICES EXECUTION

(71) Applicant: Shreeshankar Chatterjee, Fremont, CA (US)

(72) Inventor: Shreeshankar Chatterjee, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 90 days.

(21) Appl. No.: 15/924,154

(22) Filed: Mar. 16, 2018

(51) Int. Cl.
*G06F 15/173* (2006.01)
*H04L 12/24* (2006.01)
*H04L 29/08* (2006.01)

(52) U.S. Cl.
CPC ........ *H04L 41/145* (2013.01); *H04L 41/0803* (2013.01); *H04L 67/34* (2013.01)

(58) Field of Classification Search
CPC .... H04L 41/145; H04L 41/0803; H04L 67/34
See application file for complete search history.

(56) References Cited

U.S. PATENT DOCUMENTS

| | | | |
|---|---|---|---|
| 2003/0135509 A1* | 7/2003 | Davis | H04L 63/0227 |
| 2014/0164486 A1* | 6/2014 | Ravichandran | H04L 67/42 709/203 |
| 2014/0280959 A1* | 9/2014 | Bauer | H04L 67/1008 709/226 |
| 2015/0264127 A1* | 9/2015 | Riedy | H04L 67/1014 709/226 |
| 2016/0328268 A1* | 11/2016 | Islam | G06F 9/50 |
| 2016/0360006 A1* | 12/2016 | Hopkins | H04L 67/34 |
| 2018/0048532 A1* | 2/2018 | Poort | H04L 41/147 |
| 2018/0143825 A1* | 5/2018 | Noens | H04L 67/34 |
| 2019/0098080 A1* | 3/2019 | Bermudez | H04L 67/1008 |
| 2019/0149403 A1* | 5/2019 | Purushothaman | G06F 8/71 714/16 |
| 2019/0243686 A1* | 8/2019 | LaBute | G06F 9/505 |

* cited by examiner

*Primary Examiner* — Richard G Keehn
(74) *Attorney, Agent, or Firm* — Ferguson Braswell Fraser Kubasta PC

(57) ABSTRACT

Scaling web application execution includes receiving a web application container that includes a web application, establishing a network connection with server instances, where the server instances are partitioned into server types, and deploying simulation executions to the server instances to obtain gathered metrics. For each simulation execution, deploying includes selecting a server type to obtain a selected type, selecting a number of the server instances of the selected type to obtain a selected configuration, and executing, on the server instances, web application in web application container using the selected configuration to gather metrics for the simulation execution. Scaling web application execution further includes generating an execution model from the gathered metrics.

20 Claims, 6 Drawing Sheets

SCALABLE WEB SERVICES EXECUTION

BACKGROUND

Distributed computer systems include multiple interconnected servers that are designed to perform various computing functions. Some of the functionality provided by the distributed computer systems are performed by web applications. A web application is an internet-based application that provides web services to users and other computing devices. Usage of a web application may vary over time. For example, a web application may process more transactions per second during one part of the day than at other parts of the day. With the variation in usage along with the number of web applications being concurrently executed, distributed computer systems may include resource management. Resource management controls which servers execute which web applications in order to maximize usage of the servers while adhering to the requirements of the web applications.

SUMMARY

In general, embodiments relate to a method for scaling web application execution. The method includes receiving a web application container that includes a web application, establishing a network connection with server instances, where the server instances are partitioned into server types, and deploying simulation executions to the server instances to obtain gathered metrics. For each simulation execution, deploying includes selecting a server type to obtain a selected type, selecting a number of the server instances of the selected type to obtain a selected configuration, and executing, on the server instances, web application in web application container using the selected configuration to gather metrics for the simulation execution. The method further includes generating an execution model from the gathered metrics.

In general, embodiments relate to a distributed computing system for scaling web application execution includes a data repository configured to store a web application container and an execution model, and a computer processor in a deployment server. The computer processor is for executing instructions for causing the computer processor to receive the web application container with a web application, establish a network connection with server instances, where the of server instances are partitioned into server types, and deploy simulation executions to the server instances to obtain gathered metrics. Deploying includes, for each simulation execution, selecting a server type to obtain a selected type, selecting a number of the server instances of a selected type to obtain a selected configuration, and executing, on the server instances, web application in web application container using the selected configuration to gather metrics for the simulation execution. The instructions further cause the computer processor to generate an execution model from the gathered metrics.

In general, embodiments relate to a non-transitory computer readable medium for scaling web application execution. The non-transitory computer readable medium includes computer readable program code for receiving a web application container including a web application, establishing a network connection with server instances, wherein the server instances are partitioned into server types, and deploying simulation executions to the server instances to obtain gathered metrics. Deploying includes, for each simulation execution, selecting a server type to obtain a selected type, selecting a number of the server instances of the selected type to obtain a selected configuration, and executing, on the server instances, the web application in the web application container using the selected configuration to gather metrics for the simulation execution. The computer readable program code is further for generating an execution model from the gathered metrics.

Other aspects of the invention will be apparent from the following description and the appended claims.

DETAILED DESCRIPTION

Figure 1:
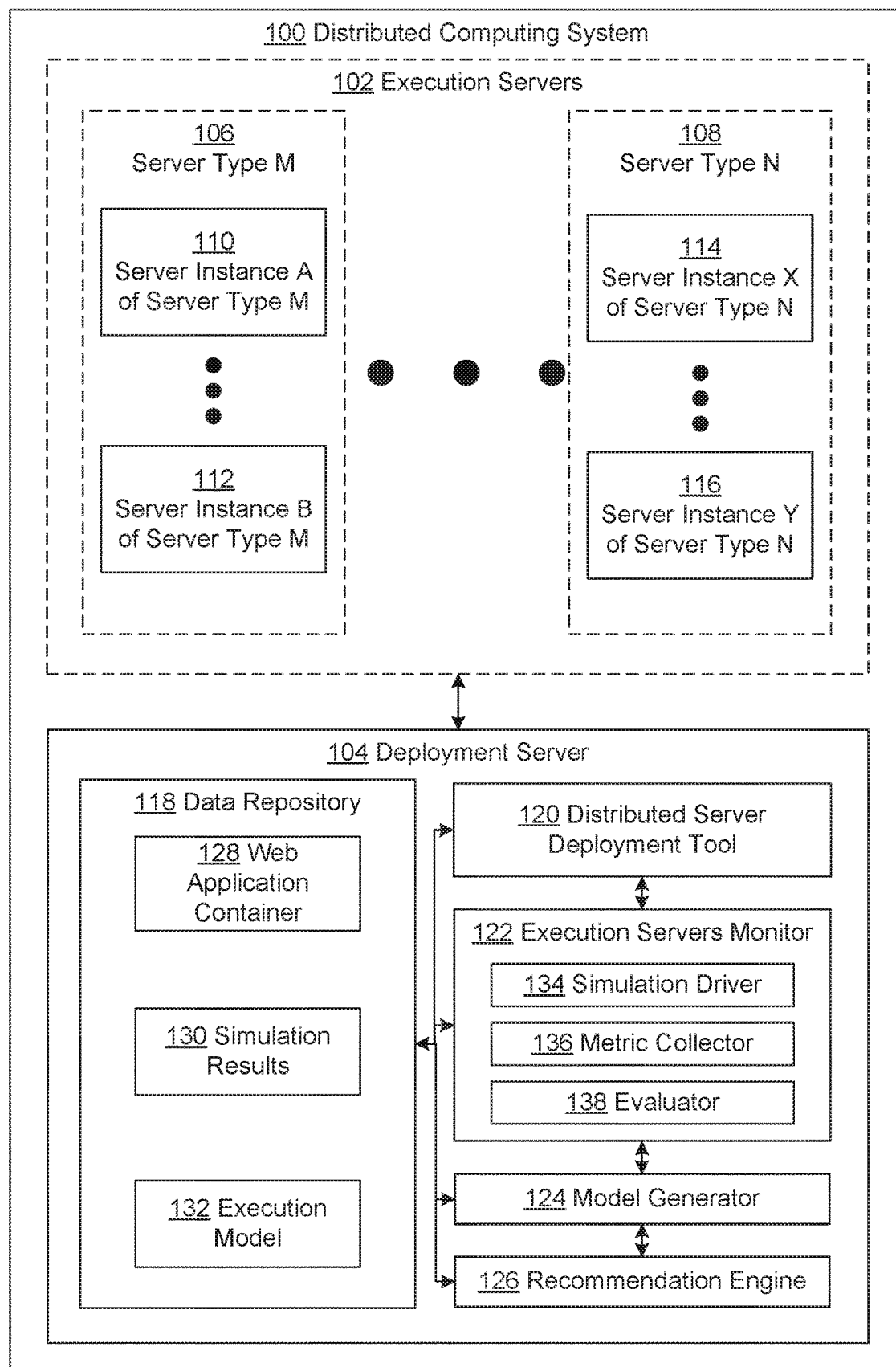
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to resource management of execution servers. Specifically, one or more embodiments establish a network connection with multiple execution server instances. Using the network connection, embodiments simulate execution of a web application in a web application container on the multiple execution server instances to gather metrics. Based on the gathered metrics, embodiments generate an execution model for the web application. Using the execution model, the web application may be deployed to the server instances in order to optimize the usage of the server instances while maintaining availability requirements of the web application.

FIG. 1 shows a diagram of a distributed computing system (100) in accordance with one or more embodiments of the invention. A distributed computing system (100) is collection of servers that provide computing system resources. Each server may be a physical device or a virtual server executing on a physical device. The servers may be interconnected via a network (not shown). The distributed computing system (100) may include execution servers (102)

and a deployment server (104). The execution servers (102) are servers that include functionality to execute web applications. Executing a web application includes processing transactions. A transaction is a sequence of events or exchanges of information that are treated as a single unit to maintain data integrity. For example, a transaction may be the set of operations to update a database and record the update in a log. The transaction may be based on a request from a remote computing device and may complete with providing a response to the request.

As shown in FIG. 1, the execution servers (102) are partitioned into server types (e.g., Server Type M (106), Server Type N (108)). The partitioning is based on the resources of the execution servers. In other words, the server instances (e.g., Server Instance A (110), Server Instance B (112), Server Instance X (114), Server Instance Y (116)) of a same server type have identical or substantially identical computing system resources. For example, the server instances of the same server type have identical or substantially identical processing power, memory, and storage capabilities. The server instances that are of the same server type may be identical servers. In particular, the server instances may have identical hardware. For the purposes of the simulations, executing the web application on one server instance of the server type is treated the same as executing the web application on a different server instance of a different server type. In one or more embodiments, server instances of different server types have different processing capabilities. In one or more embodiments, the server types may be arranged in tiers whereby each server type is in a single tier. Each tier provides a level of computing system resources, whereby subsequent tiers provide a greater level of computing system resources than previous tiers. In one or more embodiments, subsequent tiers may have a higher monetary cost than preceding tiers. In one or more embodiments, subsequent tiers may have a higher opportunity cost than preceding tiers. For example, the opportunity cost may be the inability to execute more computing system resource intensive web application. Additionally, in one or more embodiments, each server instance may have a cost (e.g., monetary cost, opportunity cost). Thus, the greater number of server instances, the greater the cost. Accordingly, an optimal configuration may be to minimize cost by reducing the number of server instances and tier of the server types while satisfying the resource requirements of the web application.

A deployment server (104) includes functionality to select server instances (e.g., Server Instance A (110), Server Instance B (112), Server Instance X (114), Server Instance Y (116)) and deploy the web application on the selected server instances. The deployment server (104) includes a data repository (118), a distributed server deployment tool (120), an execution servers monitor (122), a model generator (124), and a recommendation engine (126). Each of these components is described below.

In one or more embodiments of the invention, the data repository (118) is any type of storage unit and/or device (e.g., a file system, database, collection of tables, or any other storage mechanism) for storing data. Further, the data repository (118) may include multiple different storage units and/or devices. The multiple different storage units and/or devices may or may not be of the same type or located at the same physical site. The data repository (118) includes a web application container (128), simulation results (130), and an execution model (132).

A web application container (128) is software container for a web application. A software container is a virtualization layer that provides a constant execution environment for software (e.g., the web application) regardless of the underlying execution environment. The container virtualizes the operating system for the web application. The web application container (128) includes the web application. The web application is any software application that executes on at least one execution server and processes requests from remote clients. The web application includes instructions to perform transactions and generate results.

Simulation results (130) are results of executing simulation of the web application on the execution servers. A simulation is the execution of the web application on a set of server instances under a simulated set of operating conditions. The set of operating conditions include a number of transactions sent to the executing web application on the set of server instances. Simulation results (130) may include gathered metrics, processed information, and a success indicator. For example, gathered metrics may include metrics regarding response time (e.g., minimum and maximum response time, mean response time), and metrics regarding error rate (e.g., percentage of transactions resulting in an error). Processed metrics are metrics processed from gathered metrics. For example, processed metrics may include an error rate index and a response time index.

The execution model (132) is a model that defines a set of one or more execution server types for a predicted set of operating conditions. Specifically, the input to the execution model (132) is a set of operating conditions and the output of the execution model (132) is the one or more types of server instances and the number of server instances of each of the one or more types. The output of the execution model may further include a cost value. For example, the cost value may be the monetary cost. Embodiments of the invention generate an execution model (132) that is specific to the web application. For example, for a particular number of transactions per second, the execution model defines a number of execution servers of the server type(s). In one or more embodiments, the execution model includes functionality to output a number and type of execution server regardless of whether a simulation is performed using the number and type of execution server. The execution model is not required to output the result of the simulation, but rather may output a selection that is calculated from multiple simulation results.

Continuing with FIG. 1, the deployment server (104) includes a distributed server deployment tool (120), execution servers monitor (122), model generator (124), and recommendation engine (126). The various components may be hardware, software or a combination thereof. The distributed server deployment tool (120) includes functionality to deploy the web application on a set of server instances. Specifically, the distributed server deployment tool (120) include functionality to load the web application container (128) on a set of server instances and start execution of the web application on the selected server instances.

The execution server monitor (122) includes functionality to monitor a simulation and obtain simulation results (130). The execution server monitor (122) includes a simulation driver (134), a metric collector (136), and an evaluator (138). The simulation driver (134) includes functionality to drive a simulation. In particular, the simulation driver (134) may send transactions to deployed web application according to the simulation. The metric collector (136) includes functionality to gather metrics from a simulation. The evaluator (138) includes functionality to process gathered metrics to generate processed metrics. The evaluator (138) may further include functionality to evaluate the gathered and processed metrics to determine whether the simulation is a success.

The model generator (124) includes functionality to generate the execution model (132) from the simulation results. For example, the model generator (124) may include functionality to perform a regression analysis on the simulation results.

The recommendation engine (126) includes functionality to provide a recommended number and type of server instances using the execution model (132) for a given set of operating conditions. The recommendation engine (126) may include functionality to provide the recommendation, such as via a message or as a result in a graphical user interface. The recommendation engine (126) may include functionality to automatically trigger execution of the web application on the execution servers.

While FIG. 1 shows a configuration of components, other configurations may be used without departing from the scope of the invention. For example, various components may be combined to create a single component. As another example, the functionality performed by a single component may be performed by two or more components.

Figure 2:
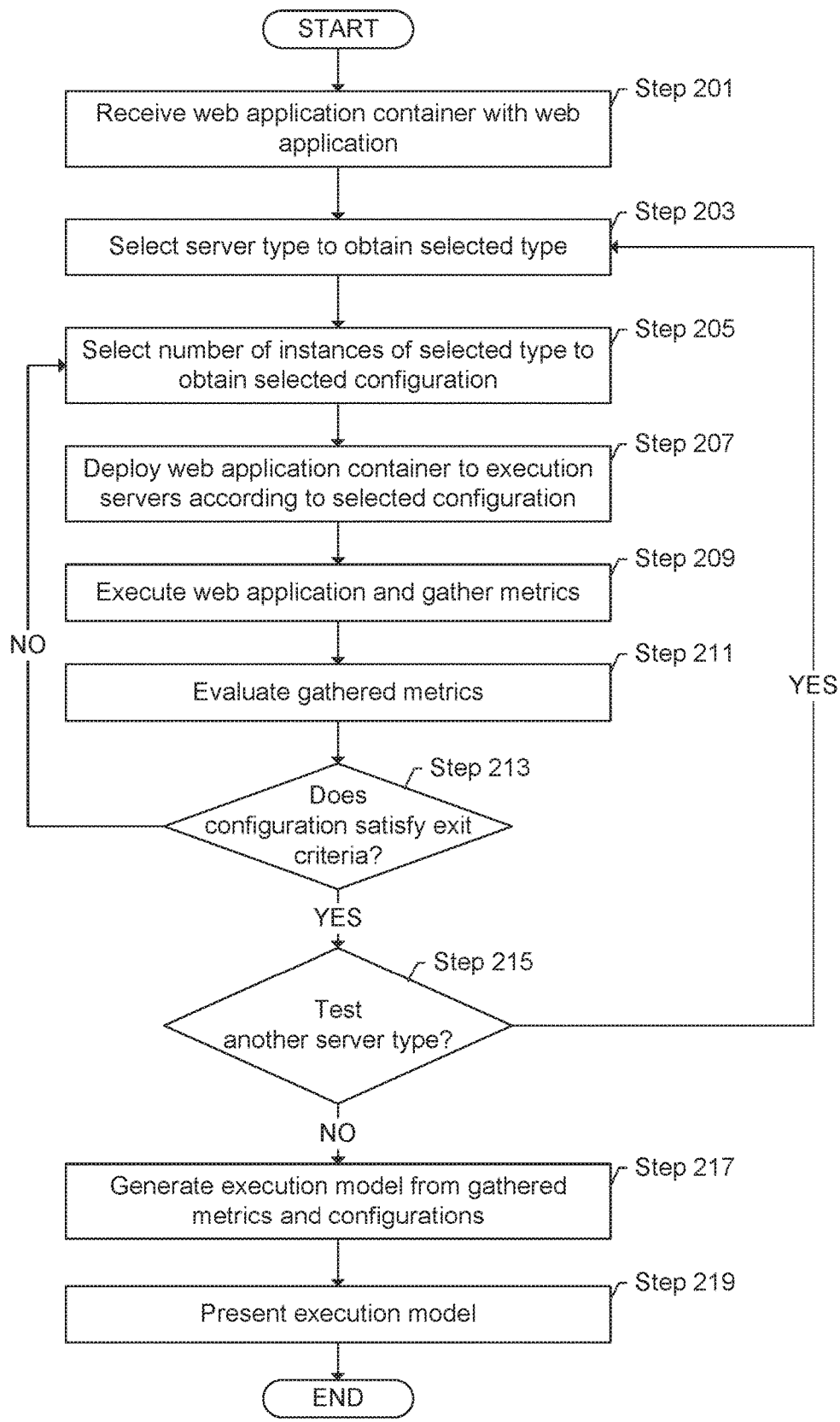
FIGS. 2, 3, and 4 shows a flowchart in accordance with one or more embodiments of the invention.
Figure 3:
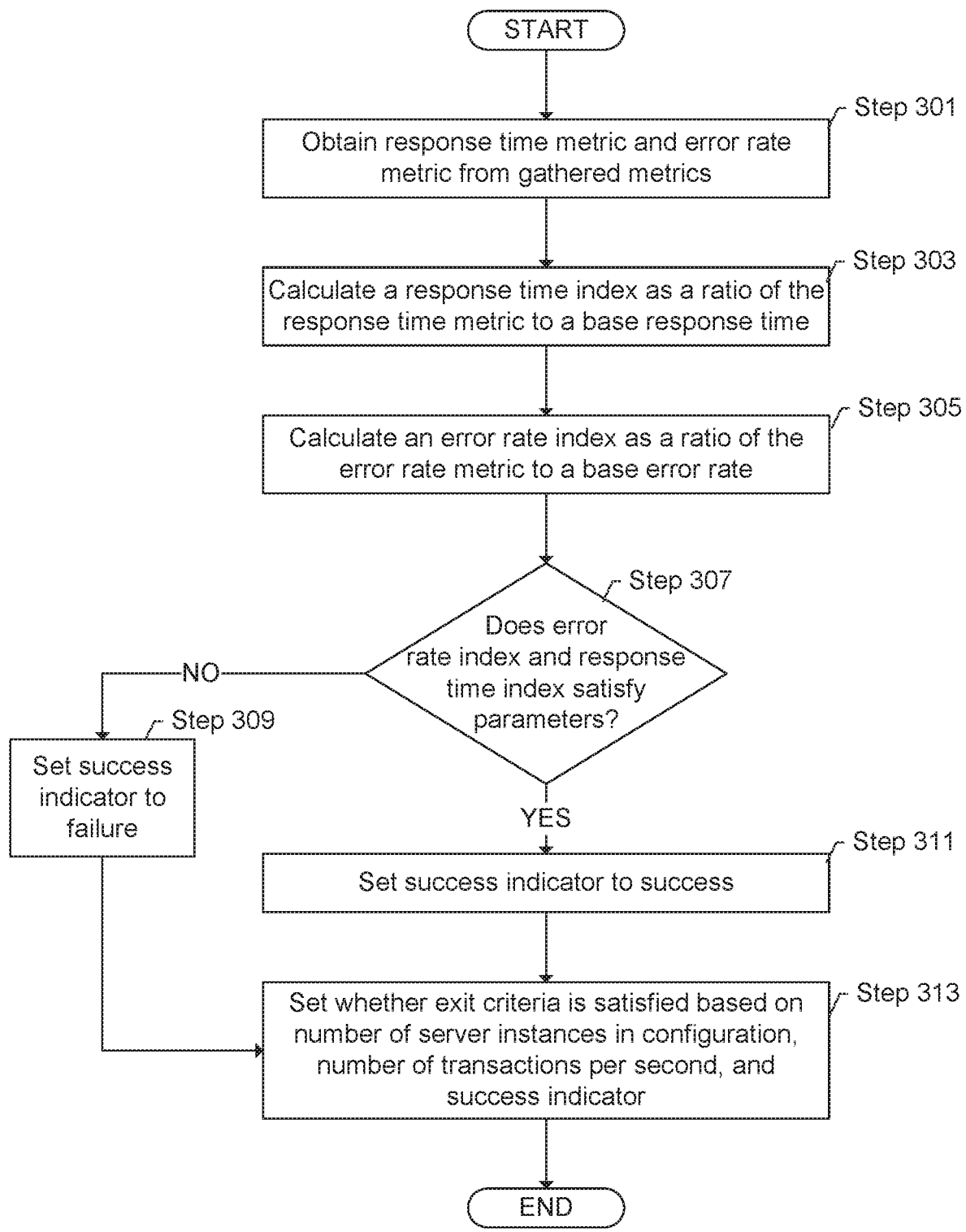
Figure 4:
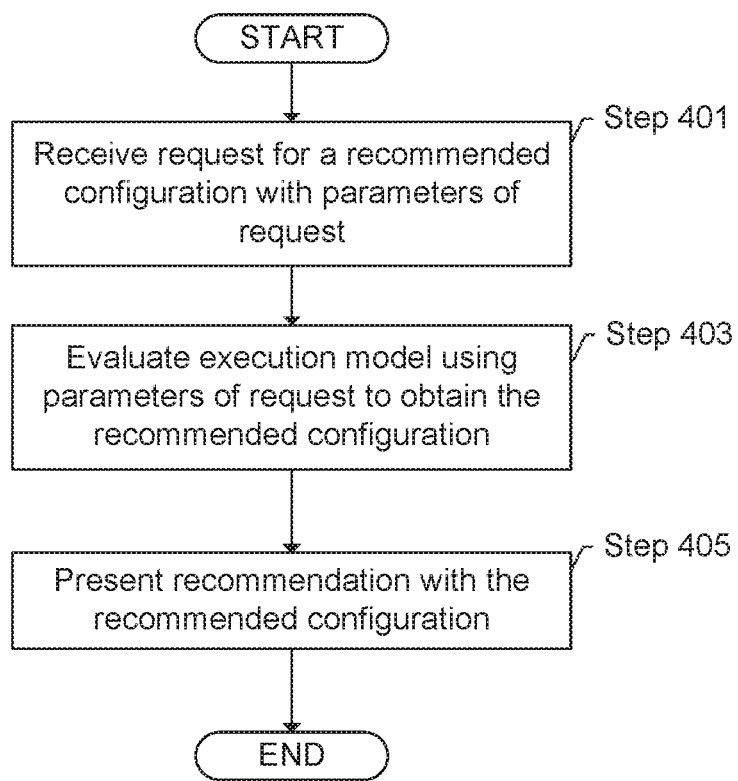

FIGS. 2, 3, and 4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart in accordance with one or more embodiments of the invention. Specifically, FIG. 2 shows a flowchart for generating an execution model in accordance with one or more embodiments of the invention.

In Step 201, a web application container with a web application is received. For example, a web application container may be loaded into the development server using another web application. As another example, the web application container may be stored in the data repository.

In Step 203, a server type is selected to obtain a selected type. In one or more embodiments, the simulation driver iterates through the server types. For example, the simulation driver may start with the server type at the lowest tier initially. Once simulations at the lowest tier are completed, the simulation driver may iterate to the next tier. The simulations may proceed iteratively through the tiers of server types.

In Step 205, a number of server instances is selected to obtain a selected configuration. In one or more embodiments, the selected configuration is a combination of one or more selected server types and a number of instances of each selected server type. Selecting a number of server instances may be performed as follows. The web application may have a predicted minimum number of transactions per second that should be satisfied by the execution of the web application. The predicted number may be further reduced to allow for a margin of error. Further, the processing capability of the selected server type may be used to predict the number of server instances required to process the predicted minimum number of transactions per second of the web application. The predicted number of server instances may be further reduced to allow for a possible margin of error and obtain a selected number.

In Step 207, the web application container is deployed to the execution servers according to the selected configuration. In one or more embodiments, specific server instances are selected to match the number of server instances and the selected type of server instance in the selected configuration. Resource management techniques may be used to select the server instances. In other words, load balancing may be performed when selecting the server instances according to the selected configuration.

In Step 209, the web application is executed, and metrics are gathered during execution. In one or more embodiments, requests are sent to the deployed web application to match a selecting set of operating parameters. The operating parameters may be according to the predicted minimum number of transactions per second. A selected set of requests are created to create the number of transactions per second. The requests are simulated requests. As requests are sent, metrics from sending the requests are obtained. The metric collector may use the time in which each request is sent and the time in which the result for the request is received to obtain a response time. The metric collector may further use the type of response (e.g., success or failure) to determine whether an error in execution exists. In one or more embodiments, the execution is performed over a period of time to obtain statistically significant results.

In Step 211, the gathered metrics are evaluated. The gathered metrics are processed to obtain process metrics. For example, the response time for each request may be used to determine average response time, and the number of errors may be used to determine an error rate. FIG. 3 shows a flowchart for evaluating the gathered metrics in accordance with one or more embodiments of the invention.

Continuing with FIG. 2, in Step 213, a determination is made whether the selected configuration satisfies exit criteria in accordance with one or more embodiments of the invention. The exit criteria define whether to switch to a different server type. The exit criteria distinguish between increasing the number of server instances and selecting the next tier of server type. The exit criteria may be based on the cost of respective server types. In particular, if increasing the number of server instances is less than switching to the next server type, then the exit criteria is not satisfied in accordance with one or more embodiments of the invention. In contrast, if the predicted minimum number of server instances of the next server type costs less than the next number of server instances, then the exit criteria is satisfied. In one or more embodiments, the exit criteria may further be based on a success indicator of the simulation using the configuration. For example, if the success indicator indicates success of the simulation. Success may be defined as whether the configuration satisfies predefined requirements for the web application. The predefined requirements may be provided as a parameter to the simulation. In one or more embodiments, the simulations perform stress testing. Thus, if the success indicator is success, then the same selected configuration may be tested with additional number of transactions per second.

If the exit criteria are not satisfied, the flow proceeds to Step 205. In Step 205, the number of instances of the selected type is selected. As described above, the number of instances may remain the same as the previous configuration. As another example, the number of instances may be incrementally increased. The size of the increment may be dependent on the amount of time to perform the simulations.

In Step 215, a determination is made whether to test another server type. In one or more embodiments, the system proceeds to iteratively test each server type. The next tier of server type may be tested with a failed set of operating parameters or with an incrementally additional number of transactions per second.

In Step 217, if a determination is made not to test another server type, the flow may proceed to generate an execution model from the gathered metrics and the configurations. The execution model may be generated by performing a regression analysis between successful configurations. The regression analysis generates a function, whereby the inputs of the function are operating parameters and the output of the function are number of server instances and server types. In one or more embodiments, the function is a discrete function.

In Step 219, the execution model is presented. For example, the execution model may be transmitted to a web application deployment team. The web application deployment team may use the execution model to select the server instances or server type. In other embodiments, the execution model is presented as part of a second web application. For example, the second web application may receive the operating parameters and respond with a configuration. In some embodiments, presenting the execution model may include using the execution model to automatically deploy the web application to an optimal configuration.

FIG. 3 shows a diagram for evaluating a configuration in accordance with one or more embodiments of the invention. In Step 301, a response time metric and error rate metric are obtained from gathered metrics. In one or more embodiments, an average response time for each of the server instances executing the simulation is calculated by the evaluator. Similarly, an error rate, or percentage of failed responses to total number of requests, is calculated from the gathered metrics.

In Step 303, a response time index is calculated as a ratio of the response time metric to a base response time. The base response time may be provided as part of the simulation parameter. For example, the base response time may be a minimal acceptable response time. The response time metric may be divided by the base response time to obtain the response time index.

In Step 305, an error rate index is calculated as a ratio of the error metric to a base error rate. Similar to the base response time, the base error rate may be provided as part of the simulation parameter. For example, the base error rate may be a minimal acceptable error rate for the web application. The error rate metric may be divided by the base error rate to obtain the error rate index.

In Step 307, a determination is made whether the error rate index and the response time index satisfy parameters. The parameters may be a minimum acceptable error rate and response time for the configuration. If the error rate index and the response time index do not satisfy the parameters, then the success indicator is set to failure in Step 309. For example, the value of the success indicator is set to indicate failure. In one or more embodiments, either one of the error rate index and response time index failing to satisfy the corresponding parameter may cause the value of the success indicator to be failure.

If the error rate index and the response time index do satisfy the parameters, then the success indicator is set to success in Step 311. In other words, the value of the success indicator is set to success.

In Step 313, whether the exit criteria are satisfied is set based on the number of server instances in the configuration, the number of transactions per second, and the success indicator. If the success indicator indicates failure and a maximum number of server instances are used in the configuration, then the exit criteria may be satisfied. Thus, the number of server instances and the type of server instances for a subsequent configuration may be dependent on a success indicator for a preceding configuration. Setting whether the exit criteria is satisfied may be performed as discussed above with reference to FIG. 2.

Using the various simulations, the execution model is generated as described above in FIG. 2. The execution model may be used as described in FIG. 4. FIG. 4 shows a flowchart for generating and presenting a recommendation in accordance with one or more embodiments of the invention. In Step 401, a request for a recommended configuration is received. The request includes parameters such as a predicted number of requests/responses, a predicted number of transactions per second, a maximum cost, etc.

In Step 403, the execution model is evaluated using the parameters of the request to obtain the recommended configuration. In one or more embodiments, the parameters may be different than the simulated set of parameters. However, the regression analysis may generate a complete execution model for a predicted maximum and minimum number of transactions per second.

In Step 405, the recommendation with the recommended configuration is presented. For example, the recommended configuration may be presented in an interface (e.g., graphical user interface, application programming interface). By way of another example, the web application container may be deployed to the execution servers in a production environment according to the recommended configuration.

Figure 5:
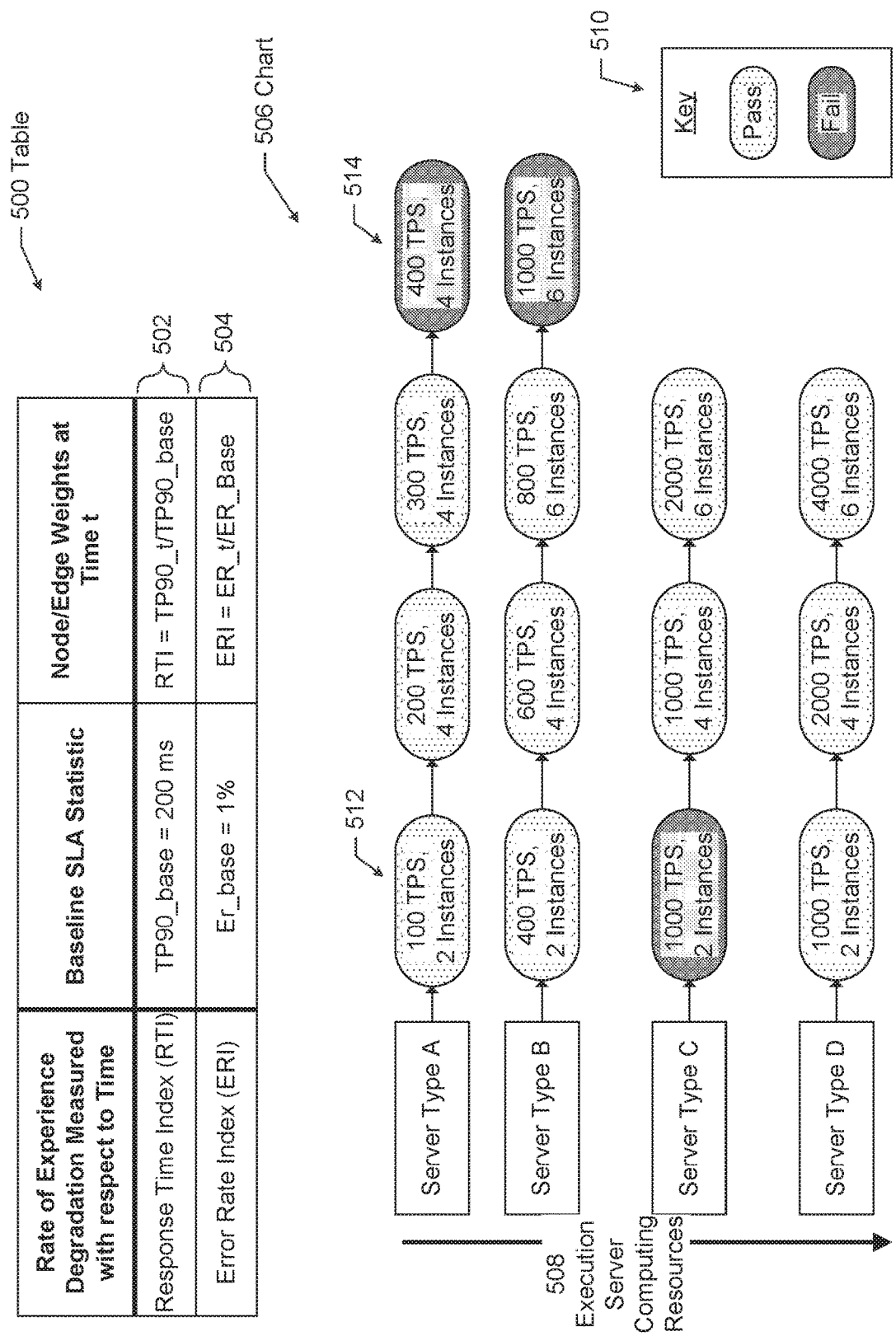
FIG. 5 shows an example in accordance with one or more embodiments of the invention.

FIG. 5 shows an example for performing simulations and generating an execution model in accordance with one or more embodiments of the invention. The following example is for explanatory purposes only and not intended to limit the scope of the invention. Table (500) shows a rate of experience degradation measured with respect to time. The first row (502) of the table is the response time index metric. The second row (504) of the table is the error rate index metric. As shown in the column labeled baseline service level agreement (SLA) statistic of table (500), the baseline response time is 200 milliseconds (ms), and the baseline error rate is 1%. The response time index is the response time at time t (TP90_t) divided by the baseline response time (TP90_base). The error rate index is index is the error rate at time t (ER_t) divided by the baseline error rate (ER_base). Using the table (500), simulations are performed, and the gathered metrics are evaluated as described in the chart (506).

As shown in the chart (506), four server types (e.g., server type A, server type B, server type C, and server type D) are tested. Each successive server type has increasing computing system resources (508) that may provide faster execution time and/or greater throughput. Each row of the chart (506) is for a different server type. Further, key (510) shows the value of the success indicator for the corresponding node of the chart (506). TPS in the chart (506) is transactions per second and instances is the number of server instances. Thus, as shown in the chart (506), 100 TPS on 2 server instances of server type A (e.g., node (512)) has a value of success for the success indicator. In contrast, 400 TPS on 4 server instances of server type A has failure as the value of the success indicator (e.g., node (514)).

In the simulations, because failure exists with 400 TPS on 4 server instances of server type A, the next simulation is performed using 400 TPS on 2 server instances of server type B. Successive simulations continue to be performed on varying operating parameters and selected configurations. For example, with failure of 1000 TPS on 2 instances of server type C, 4 instances on server type C are tested. After testing 1000 TPS on 6 instances of server type C, a determination may be made to switch to server type D due to incremental cost increase. As shown in the example chart (506), the exit criteria may not be completely dependent on the value of the success criteria. After performing simulations, an execution model is generated for the web application. The execution model may be generated using a regression analysis. Thus, if 3000 TPS are predicted for a predefined time period, the execution model may provide a recommended configuration of 5 instances of server type D.

FIG. 5 is provided for example purposes only. The number of server instances may be greatly increased with the web application. For example, a web application may be expected to process several hundred transactions per second. Thus, the example of FIG. 5 is a simplified example for illustrative purposes only.

Figure 6A:
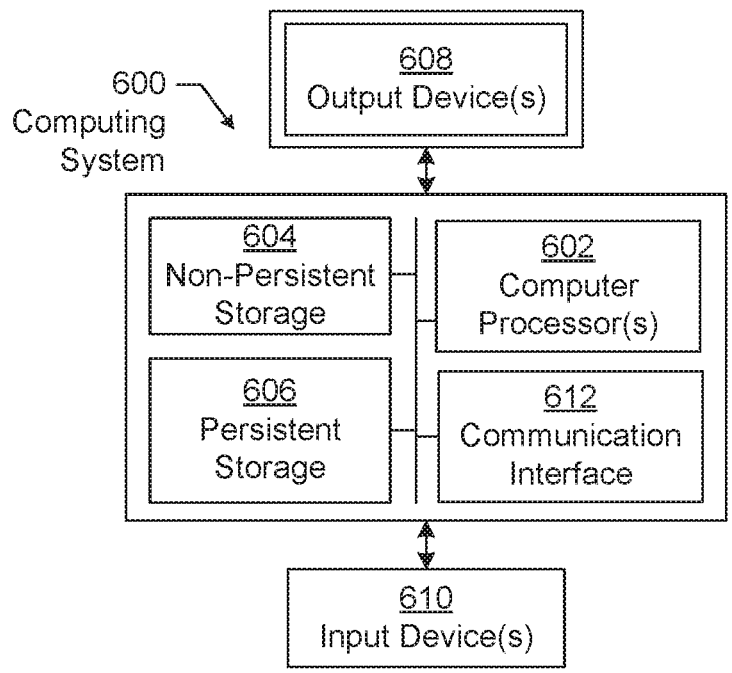
FIGS. 6A and 6B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
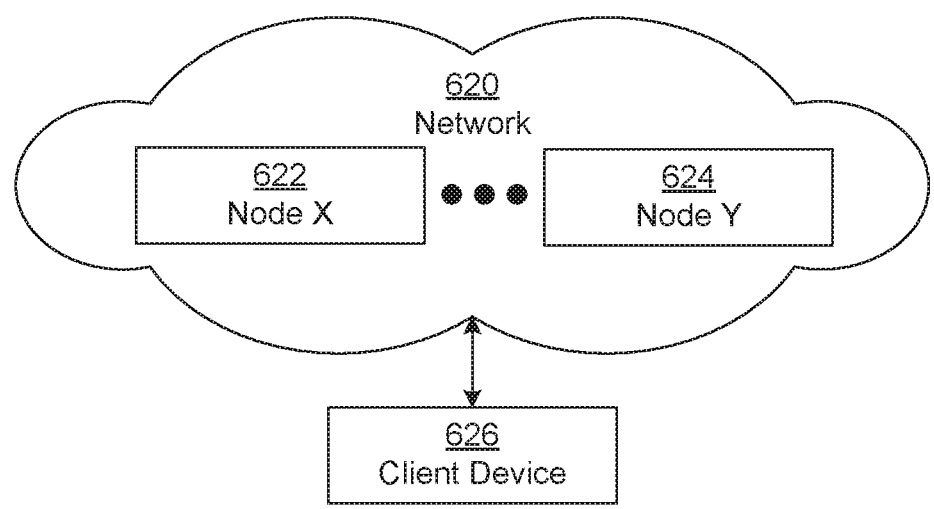

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scaling web application execution comprising:
   receiving a web application container comprising a web application;
   establishing a network connection with a plurality of server instances, the plurality of server instances partitioned into a plurality of server types based on hardware processing capabilities, wherein the plurality of server types is arranged in tiers of differing levels of computing system resources;
   deploying a simulation execution to the plurality of server instances to obtain a first plurality of gathered metrics by:
      selecting a first server type of the plurality of server types to obtain a first selected type,
      selecting a number of the plurality of server instances of the first selected type to obtain a first selected configuration, and
      executing, on the first selected configuration, the web application in the web application container to gather the first plurality of gathered metrics for the simulation execution;
   determining whether, as a result of the simulation execution, a metric in the first plurality of gathered metrics fails to satisfy a baseline when executed on the first selected configuration;
   responsive to determining that the metric fails to meet the baseline:
      selecting a second server type of the plurality of server types to obtain a second selected type;
      selecting a second number of the plurality of server instances of the second selected type to obtain a second selected configuration; and
      executing, on the second selected configuration, the web application in the web application container to gather a second plurality of gathered metrics for the simulation execution; and
   generating an execution model from one of the first plurality of gathered metrics and the second plurality of gathered metrics.

2. The method of claim 1, wherein deploying the plurality of simulation executions further comprises for each simulation execution:
   selecting a number of transactions per second,
   issuing, while executing the web application, a plurality of requests to the web application matching the number of transactions per second, and receiving, for the plurality of requests, a plurality of responses from the web application.

3. The method of claim 2, wherein the number of transactions per second is selected based on a success indicator of a preceding simulation execution of the plurality of simulation executions.

4. The method of claim 1, wherein the server type is selected based on a success indicator of a preceding simulation execution of the plurality of simulation executions.

5. The method of claim 2, further comprising:
gathering a response time metric and an error rate metric based on the plurality of responses.

6. The method of claim 4, further comprising:
calculating a response time index as a ratio of the response time metric to a base response time,
calculating an error rate index as a ratio of the error rate metric to a base error rate, and
determining a success indicator based on whether the response time index and the error rate index satisfy a criterion.

7. The method of claim 1, further comprising:
receiving a request for a recommended configuration of the web application on the plurality of server instances, the request comprising a plurality of parameters;
evaluating the execution model using the plurality of parameters to obtain the recommended configuration; and
presenting a recommendation with the recommended configuration.

8. The method of claim 7, further comprising:
deploying the web application container to the plurality of server instances according to the recommended configuration.

9. The method of claim 7, wherein the recommended configuration is different from each selected configuration in the plurality of simulation executions.

10. The method of claim 7, wherein the plurality of parameters in the request comprise a number of transactions per second.

11. The method of claim 7, wherein the recommended configurations comprises a recommended number of the plurality of server instances of a recommended server type in the plurality of server types.

12. The method of claim 1, further comprising:
identifying a subset of the plurality of simulation executions resulting in a success indicator; and
performing a regression analysis on the plurality of gathered metrics from the subset to generate the execution model.

13. A distributed computing system for scaling web application execution comprising:
a data repository configured to store a web application container and an execution model; and
a computer processor in a deployment server, the computer processor for executing instructions for causing the computer processor to:
receive the web application container comprising a web application;
establish a network connection with a plurality of server instances, the plurality of server instances partitioned into a plurality of server types based on hardware processing capabilities, wherein the plurality of server types is arranged in tiers of differing levels of computing system resources;
deploy a simulation executions to the plurality of server instances to obtain a first plurality of gathered metrics by:
selecting a first server type of the plurality of server types to obtain a first selected type,
selecting a number of the plurality of server instances of the first selected type to obtain a first selected configuration, and
executing, on the first selected configuration, the web application in the web application container to gather the first plurality of gathered metrics for the simulation execution;
determining whether, as a result of the simulation execution, a metric in the first plurality of gathered metrics fails to satisfy a baseline when executed on the first selected configuration;
responsive to determining that the metric fails to meet the baseline:
selecting a second server type of the plurality of server types to obtain a second selected type;
selecting a second number of the plurality of server instances of the second selected type to obtain a second selected configuration; and
executing, on the second selected configuration, the web application in the web application container to gather a second plurality of gathered metrics for the simulation execution; and
generate an execution model from one of the first plurality of gathered metrics and the second plurality of gathered metrics.

14. The system of claim 13, further comprising:
a plurality of execution servers comprising the plurality of server instances.

15. The system of claim 13, wherein the server type is selected based on a success indicator of a preceding simulation execution of the plurality of simulation executions.

16. The system of claim 13, wherein the instructions further cause the computer processor to:
receive a request for a recommended configuration of the web application on the plurality of server instances, the request comprising a plurality of parameters;
evaluate the execution model using the plurality of parameters to obtain the recommended configuration; and
present a recommendation with the recommended configuration.

17. A non-transitory computer readable medium for scaling web application execution, the non-transitory computer readable medium comprising computer readable program code for:
receiving a web application container comprising a web application;
establishing a network connection with a plurality of server instances, the plurality of server instances partitioned into a plurality of server types based on hardware processing capabilities, wherein the plurality of server types is arranged in tiers of differing levels of computing system resources;
deploying a simulation execution to the plurality of server instances to obtain a first plurality of gathered metrics by:
selecting a first server type of the plurality of server types to obtain a first selected type,
selecting a number of the plurality of server instances of the first selected type to obtain a first selected configuration, and
executing, on the first selected configuration, the web application in the web application container to gather the first plurality of gathered metrics for the simulation execution;

determining whether, as a result of the simulation execution, a metric in the first plurality of gathered metrics fails to satisfy a baseline when executed on the first selected configuration;

responsive to determining that the metric fails to meet the baseline:

selecting a second server type of the plurality of server types to obtain a second selected type;

selecting a second number of the plurality of server instances of the second selected type to obtain a second selected configuration; and executing, on the second selected configuration, the web application in the web application container to gather a second plurality of gathered metrics for the simulation execution; and generating an execution model from one of the first plurality of gathered metrics and the second plurality of gathered metrics.

18. The non-transitory computer readable medium of claim 17, wherein deploying the plurality of simulation executions further comprises for each simulation execution:

selecting a number of transactions per second, issuing, while executing the web application, a plurality of requests to the web application matching the number of transactions per second, and receiving, for the plurality of requests, a plurality of responses from the web application.

19. The non-transitory computer readable medium of claim 17, further comprising computer readable program code for:

receiving a request for a recommended configuration of the web application on the plurality of server instances, the request comprising a plurality of parameters;

evaluating the execution model using the plurality of parameters to obtain the recommended configuration; and presenting a recommendation with the recommended configuration.

20. The non-transitory computer readable medium of claim 19, further comprising computer readable program code for:

deploying the web application container to the plurality of server instances according to the recommended configuration.

* * * * *

UNITED STATES PATENT AND TRADEMARK OFFICE
CERTIFICATE OF CORRECTION

PATENT NO. : 10,554,502 B1  
APPLICATION NO. : 15/924154  
DATED : February 4, 2020  
INVENTOR(S) : Shreeshankar Chatterjee Page 1 of 1

It is certified that error appears in the above-identified patent and that said Letters Patent is hereby corrected as shown below:

On the Title Page

Item (57) ABSTRACT, occurring on the tenth line, the word -- a -- should be inserted between the words "in" and "web".

In the Claims

Claim 13, Column 15, Line 65, the word "executions" should read -- execution --.

Signed and Sealed this  
Ninth Day of June, 2020

Andrei Iancu  
*Director of the United States Patent and Trademark Office*